UNITED STATES PATENT OFFICE.

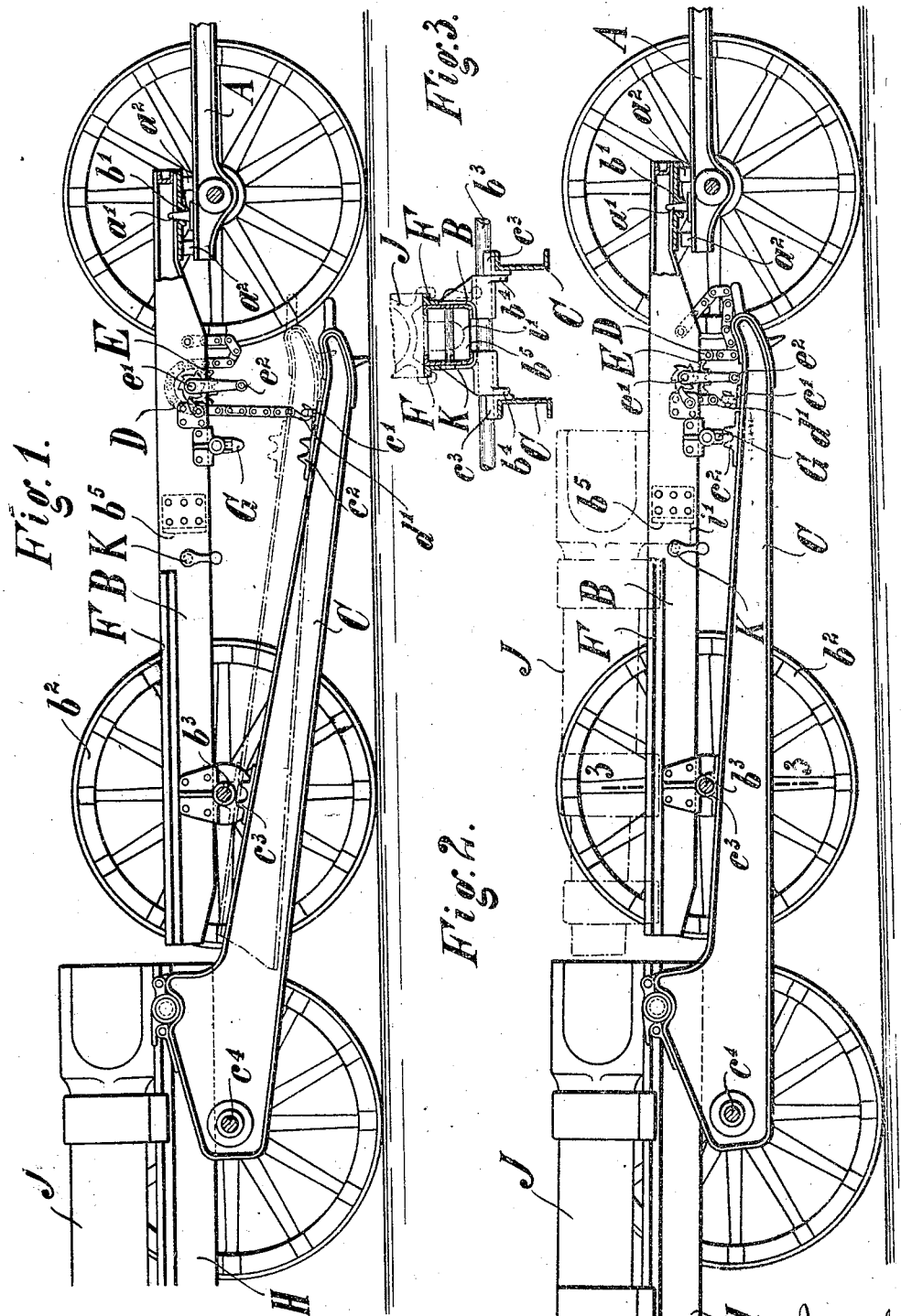

OTTO BEHNKE, OF ESSEN-ON-THE-RUHR, GERMANY, ASSIGNOR TO FRIED. KRUPP AKTIENGE-SELLSCHAFT, OF ESSEN-ON-THE-RUHR, GERMANY.

TRANSPORT-CARRIAGE FOR PORTABLE GUNS.

932,096.   Specification of Letters Patent.   Patented Aug. 24, 1909.

Application filed June 23, 1908. Serial No. 439,994.

*To all whom it may concern:*

Be it known that I, OTTO BEHNKE, a subject of the Emperor of Germany, and a resident of Essen-on-the-Ruhr, Germany, have invented certain new and useful Improvements in Transport-Carriages for Portable Guns, of which the following is a specification.

The present invention relates to the type of transport carriages for portable guns with barrel-recoil which has a slide track corresponding with the slide track of the service carriage of the gun and in which, by lifting the trail of the gun-mount, feet or supports provided on the slide track can be brought into engagement with seats provided on the trail. A transport carriage of this type is, for instance, shown in the U. S. Patent No. 723,684 of March 24, 1903.

The object of the invention is to provide a transport carriage of the aforesaid type which is of very simple construction, is easily manipulated, has small weight and yet makes it possible to exactly and immovably couple the transport carriage to the service carriage.

One embodiment of the invention is shown in the accompanying drawings, by way of example.

Figure 1 is a side view of the transport carriage and the corresponding gun; some parts of the transport carriage being shown in section and the transport carriage and the gun being shown in the position which they assume just prior to being coupled together; Fig. 2 is a view corresponding to Fig. 1 and shows the parts when the transport carriage is coupled to the gun, and Fig. 3 is a section on line 3—3, Fig. 2.

The transport carriage consists of a fore carriage A and a rear carriage both having two wheels. The rear carriage is composed of the wheel-axle $b^3$, the wheels $b^2$ and the perch B consisting of two parallel cheeks. Near its forward end the perch B is provided with an eye bearing $b'$ which engages with a vertical king-bolt $a'$ on the fore carriage A. Due to this connection the rear carriage can carry out both a horizontal and a vertical swinging movement and also a tilting movement relatively to the fore carriage, in a manner similar to that of a mount relatively to the limber. In order to relieve the bolt $a'$ and the bearing $b'$ of vertical pressure the fore carriage A is provided with rails $a^2$ on which the perch B can rest. A hoisting device is arranged on the perch near the bearing $b'$ and serves to raise the gun-trail C. The chain D of the hoisting device is carried over a sprocket-wheel E. The shaft $e'$ of the wheel E is journaled in the cheeks of the perch and can be rotated by means of a crank $e^2$. The free end of the chain D is provided with a hook $d'$ for which an eye $c'$ is provided on the gun-trail.

The upper edges of the cheeks of the perch B are provided with rails F which serve to hold the gun barrel during transport. These rails are of a shape that corresponds to the shape of the rails on the slide track carrier H of the gun and, after the gun barrel has been disconnected from the recoil-brake and the recuperator of the gun, the barrel can be drawn over on the rails of the transport carriage.

In the proximity of the hoisting device short feet G are jointed to the cheeks of the perch. The gun-trail C is provided with seats or rests $c^2$ for the free ends of the feet. Between the rests and the axle $c^4$ of the gun the trail is provided with rests $c^3$ which serve to receive the axle $b^3$ when the gun-trail C is lifted while being under the transport carriage.

When engagement is effected between the axle $b^3$ and the rests $c^3$ it is essential that the longitudinal axis of the gun-trail becomes located exactly vertically under the longitudinal axis of the perch B and to that end the axle $b^3$ is provided with two projections $b^4$ (Fig. 3) which are located symmetrically relatively to the longitudinal axis of the perch and against which the opposing side walls of the rests $c^3$ can be caused to abut. When engagement has been effected between the axle $b^3$ and the rests $c^3$ the projections $b^4$ prevent lateral displacement of the slide-track F relatively to the gun-trail.

When the gun barrel C assumes the position shown in full lines in Fig. 1 relatively to the perch B the rests $c^3$ and $c^2$ are located such a distance from the axle $b^3$ and the feet G that, when the gun-trail is raised, engagement will first take place between the axle $b^3$ and the rests $c^3$ (compare the position of the trail of the gun-carriage indicated in Fig. 1 by dot and dash lines). When the trail is further raised to also bring the feet G in engagement with their rests $c^2$ the wheels $b^2$ of the rear carriage will therefore be lifted off the ground.

When both the axle $b^3$ and the feet G engage with the corresponding rests on the gun-trail the slide-track F of the perch B has such a position relatively to the service carriage that it forms a rectilinear extension of the slide-track of the track-carrier H of the gun, the latter track having been brought into a predetermined position by means of the elevating mechanism.

When it is desired to transfer the gun-barrel to the transport carriage the latter is first pushed with the rear carriage forward over the gun-trail until the axle $b^3$ and the feet G are located exactly over the rests $c^3$ and $c^2$. Due care must be taken that the longitudinal axis of the perch B is then located as exactly as possible in vertical alinement with the longitudinal axis of the service carriage. After the hook $d'$ of the chain D has been moved down and inserted in the eye $c'$ of the gun-trail (Fig. 1) the chain D is then wound up to elevate the trail to such an extent that the rests $c^3$ engage with the axle $b^3$. While this is being done care must be taken that the opposing side walls of the rests $c^3$ come to lie against the projections $b^4$ on the axle $b^3$ (Fig. 3). If necessary the correct engagement of the rests $c^3$ with the axle $b^3$ must be effected by swinging or shifting the transport carriage or the service carriage. When the raising of the gun-trail C is continued by the further winding up of the chain D a vertical swinging movement is imparted to the rear carriage relatively to the fore carriage, and the wheels of the rear carriage move off the ground. When the feet G come into engagement with the rests $c^2$ the service carriage is firmly coupled to the transport carriage (Fig. 2).

If, by reason of uneven terrain, the axle $b^3$ of the transport carriage is inclined to the axle $c^4$ of the service carriage the rests $c^3$ will not enter simultaneously into engagement with the axle $b^3$ when the gun-trail is raised. Engagement will then first take place between only one of the rests $c^3$ and the axle $b^3$ and when the gun-trail is further raised a tilting movement will be imparted to the rear carriage until the other rest $c^3$ comes into engagement with the axle $b^3$.

When the parts assume the position shown in Fig. 2 the slide-track carrier H of the gun is swung by means of the elevating mechanism of the gun to such an extent that its slide-track forms a rectilinear extension of the slide-track F of the transport carriage. The gun-barrel is thereupon disconnected from the recoil-brake and the recuperator and by means of a tackle or the like the barrel is drawn over on the slide-track of the transport carriage to such an extent that the horn $i'$ (Fig. 2) of the gun-barrel abuts against the transverse wall $b^5$ of the perch B (see the position of the gun-barrel shown in dotted lines in Fig. 2). The gun-barrel is secured in this position by means of a key-bolt K which is inserted through the cheeks of the perch. The crank $e^2$ of the hoisting device is thereupon turned in the opposite direction to lower the gun-trail and the rear carriage of the transport carriage. The steps of the proceeding as described in connection with the raising of the gun-trail then take place in reversed order. After the hook $d'$ is disengaged from the eye $c'$ and the chain is wound up the transport carriage is ready for travel.

Having thus described the invention, what is claimed and desired to be secured by Letters Patent is:

1. The combination with a service carriage for portable guns; of a transport carriage for the same provided with a relatively fixed slide track; means carried by the gun trail for engaging one axle of the transport carriage; and a hoisting device mounted on the transport carriage for lifting the rear end of the gun trail.

2. A transport carriage for portable guns provided with a slide track carried by a relatively fixed part of the carriage, means interacting between the carriage and the rear of the gun trail for raising the gun-trail; and further means interacting between the gun-trail and one end of the service carriage to bring the slide track into position to remove the gun-barrel rearwardly from its service carriage.

3. A transport carriage for portable guns comprising a fore carriage, a rear carriage movable relatively to the fore carriage and provided with a relatively fixed slide track, means interacting between the gun-trail and said rear carriage whereby the rear carriage may be elevated to bring the slide track into position to remove the gun-barrel rearwardly from its service carriage, and hoisting means carried by said transport carriage, said hoisting means being adapted to raise the end of the gun-trail.

4. A transport carriage for portable guns provided with trails, said carriage comprising a fore carriage, a rear carriage movably connected at one end to the fore carriage and having a fixed perch provided with a slide track, means for raising the trail of the gun, and means operated by said trail for raising the other end of the rear carriage from the ground to bring the slide track into position to receive the gun barrel from its service carriage.

5. The combination with the service carriage having a trail and provided with a slide track for the gun barrel, of a transport carriage having a relatively fixed slide track, means for raising the trail, and means mounted on the trail for engaging the rear axle of said carriage whereby the raising of the trail causes the transport carriage to be elevated at one end to bring its slide track into position to receive the gun barrel from the slide track of the service carriage.

6. The combination with the service carriage having a trail and provided with a slide track for the gun barrel, of a transport carriage comprising relatively movable carriages and having a relatively fixed slide track on one of said carriages, means for raising the trail, coöperating means on one of the relatively movable carriages and the trail whereby the raising of the trail causes the transport carriage to be elevated at one end to bring its slide track into position to receive the gun barrel from the slide track of the service carriage, and means for centering the trail relatively to the transport carriage.

7. The combination with the service carriage having a trail and provided with a slide track for the gun barrel, of a transport carriage comprising a fore carriage and a rear carriage movably connected at one end to the fore carriage and having a wheel axle and a slide track at its other end, means on the rear carriage for raising the trail, and means on the trail adapted to engage the axle of the rear carriage to elevate the free end of the rear carriage when the trail is raised and to bring the slide track of the rear carriage into position to receive the gun barrel from the slide track of the service carriage.

8. The combination with the service carriage having a trail and provided with a slide track for the gun barrel, of a transport carriage comprising a fore carriage and a rear carriage movably connected at one end to the fore carriage and having its free end provided with the wheel axle and a relatively fixed slide track, means on the rear carriage for elevating the trail, rests on the trail adapted to engage the axle of the rear carriage when the trail is elevated to cause the free end of the rear carriage to be raised off the ground to permit its slide track to receive the gun barrel from the slide track of the service carriage, and projections on the wheel axle adapted to engage the rests to center the trail relatively to the rear carriage.

The foregoing specification signed at Dusseldorf, Germany, this twenty-fifth day of May, 1908.

OTTO BEHNKE.

In presence of—
PETER LIEBER,
WILHELM FLASCHE.